United States Patent [19]

Shafer et al.

[11] 4,116,131
[45] Sep. 26, 1978

[54] SOLID PROPELLANT MOTOR

[75] Inventors: John I. Shafer, Pasadena; Harold E. Marsh, Jr., La Canada, both of Calif.

[73] Assignee: The United States of America as represented by the Administrator of the National Aeronautics and Space Administration, Washington, D.C.

[21] Appl. No.: 48,621

[22] Filed: May 13, 1970

[51] Int. Cl.² ............................................. F42B 1/00
[52] U.S. Cl. ................................. 102/103; 149/19.4; 149/42; 149/43; 149/44; 149/76; 149/83; 149/85
[58] Field of Search ................. 149/2, 19, 20, 44, 83, 149/19.4, 43, 42, 76, 85; 102/103

[56] References Cited

U.S. PATENT DOCUMENTS

| | | | |
|---|---|---|---|
| 2,958,288 | 11/1960 | Campbell et al. | 102/103 |
| 3,092,527 | 6/1963 | Schaafsma | 149/19 |
| 3,347,047 | 10/1967 | Hartz | 102/103 X |
| 3,381,614 | 5/1968 | Ratz | 102/103 |
| 3,407,595 | 10/1968 | Peterson | 102/103 X |
| 3,426,528 | 2/1969 | Mangum et al. | 102/103 X |
| 3,427,805 | 2/1969 | Osburn | 102/103 X |
| 3,433,158 | 3/1969 | Pierce | 102/103 |
| 3,446,018 | 5/1969 | Macbeth | 102/103 X |
| 3,507,114 | 4/1970 | Webb | 102/103 X |
| 3,578,520 | 5/1971 | Dolan et al. | 102/103 X |
| 3,686,868 | 8/1972 | Chase | 102/103 X |

Primary Examiner—Stephen J. Lechert, Jr.
Attorney, Agent, or Firm—Monte F. Mott; John R. Manning; Wilfred Grifka

[57] ABSTRACT

A case bonded end burning solid propellant rocket motor utilizing a propellant having sufficiently low modulus to avoid chamber buckling on cooling from cure and sufficiently high elongation to sustain the stresses induced without cracking, the propellant being zone cured within the motor case at high pressures equal to or approaching the pressure at which the motor will operate during combustion. A solid propellant motor having a burning time long enough that its spacecraft would be limited to a maximum acceleration of less than 1 g is provided by one version of the case bonded end burning solid propellant motor of the invention.

8 Claims, 1 Drawing Figure

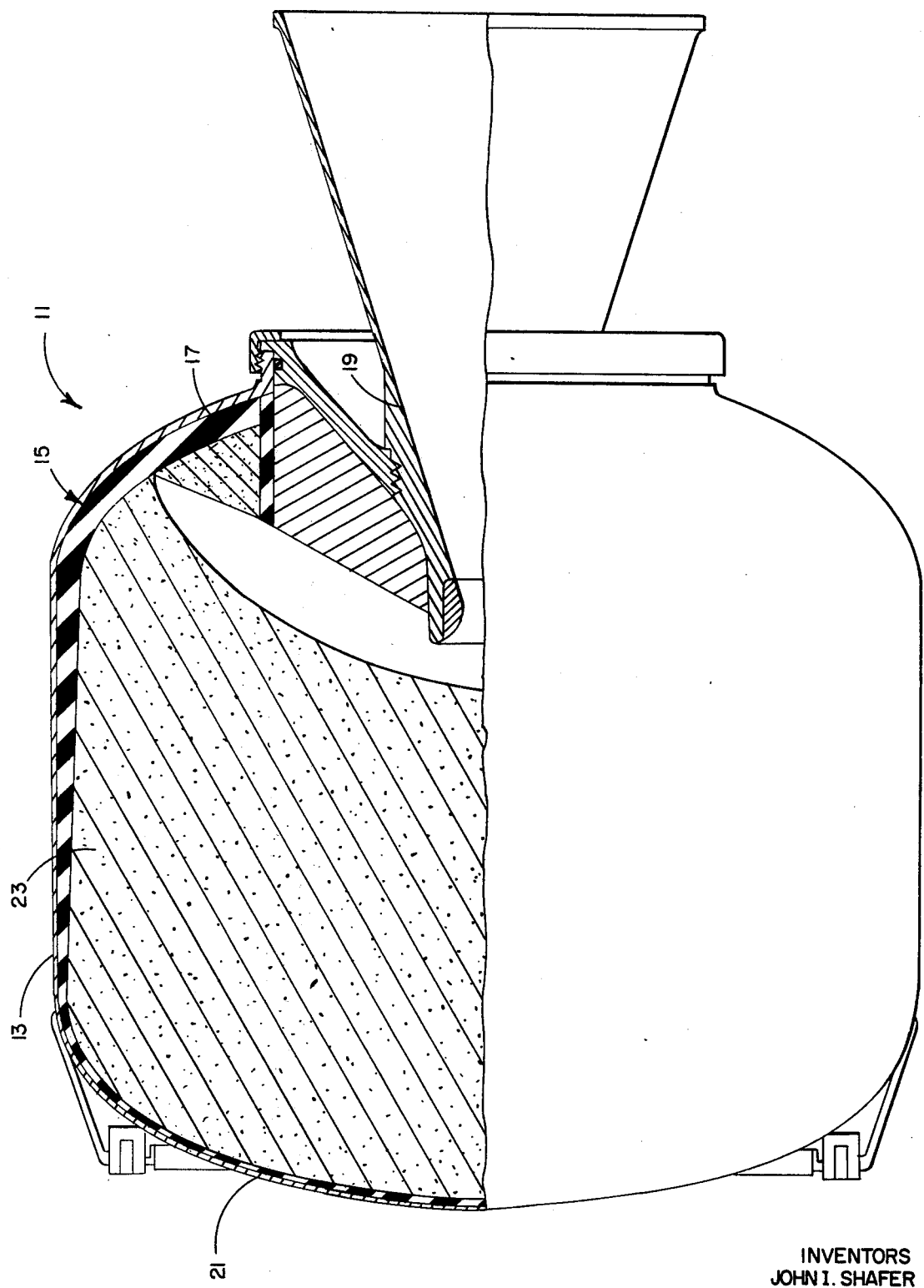

SOLID PROPELLANT MOTOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention is in the field of rocket motors. More particularly, the invention relates to a new solid propellant motor and method of making same.

2. Description of the Prior Art

The concept of an end burning solid propellant grain can be traced to the early days of rocketry. The jet assist takeoff, or JATO units, developed in this early period for aircraft utilized end burning solid propellant charges. The propellant used for these applications was a black powder pressed into and filling a rocket chamber under very high pressure in order to insure consolidation and reliable firings. Upon storing and/or temperature cycling, however, the motors tended to blow up in unpredicatable fashion. The problem of cracking or shrinkage pull-away of the propellant charge was eventually solved by replacing the black powder with a softer, less brittle propellant, such as one based on potassium perchlorate as an oxidizer dispersed in an amorphous matrix of asphalt. The elongation of this type of propellant was significantly better than the plain powder charge so that tension stresses on the burning charges were less severe. However, there were still motor blow-ups and an extensive research and development effort was required to adapt the newer form of the propellant to an end burning configuration. This was accomplished by forming the propellant into cartridges which in effect were cylinders that were molded undersized, inhibited on all lateral surfaces except one end by a suitable material to prevent burning on those specific surfaces, and tape-wrapped on all inhibited surfaces before being inserted as a free standing element into the rocket chamber. A separate trapping mechanism was utilized to keep the cartridge disposed, and properly constrained for handling, within the chamber or housing. Eventually, utilizing this concept, thousands of JATO type units were produced. In time, the asphalt matrix was replaced by a resin system but the cartridge form continued to be utilized as the propellant elongation was relatively low, on the order of 3 to 5%, while its modulus was relatively high, about 15000 psi.

Eventually, a new design concept evolved relating to a case bonded radial burning charge. The propellant charge was directly bonded to the case and burned in its central axis perforation radially outwardly along its entire length. This concept was developed more and more for military applications where high-performance radial burning systems were required. Most of these applications tended to be high thrust, short to medium burning time operations, which were well suited to the radial burning design. As propellant technology advanced and propellants became more rubber-like, their elongations eventually reached levels of 20, 35 and sometimes as high as 50% in high performance propellants. These propellants were well suited for the radial burning case bonded concept. Because of a special interest in polymer and propellant work, there had been developed a class of propellants with elongations as high as 150% but these were still being utilized for radial burning applications. Thus in the field of endeavor at the time of the invention, there were few requirements for a case-bonded end-burning motor, since the radial burning concept fulfilled most of the existing needs and it was the prevailing opinion, based on past experience, that such an end-burning design could not succeed.

SUMMARY OF THE INVENTION

For various space applications such as the placement into planetary orbit of spacecraft with their solar panels extended, as well as applications such as planetary capsule deflection motors, longer burning times for the rocket motors are required, together with low acceleration. For example, a solar panel can accommodate an acceleration of only 1 g, when in an extended position during retrofire. Additionally, low acceleration is often required due to the type of guidance control systems utilized. These results are achieved by the case bonded end burning solid propellant motor of the herein invention, which prior to the herein invention had not been successfully accomplished. The propellant chosen is most important to achieving a successful end burning charge that is case bonded. The propellant must have sufficient elongation and low enough modulus such that temperature variations during storage and handling and temperature expansion during firing will not cause it to crack. Thus, the propellant elongation at maximum stress should fall between 85% and 400%. The propellant secant modulus should have values in the range of 175 psi to 5 psi. Once the propellant is chosen to meet the foregoing requirements, while possessing the desired performance level in terms of specific impulse and other ballistic and chemical properties, it is cast into a motor case or housing having an insulative layer completely bonded throughout its inner surface. The insulation surface is treated to enhance the ultimate bond with the propellant charge before placing the propellant in the motor, usually by treating the insulation briefly with a chemically reactive agent dispersed in a solvent. Prior to cure, the motor case containing the propellant should be pressurized to an unusually high and regulated pressure, preferably equivalent to the operating pressure achieved in the chamber during combustion. Alternately, a cure pressure is selected such that during cooling of the motor from the cure temperature, and concurrent depressurization, the difference between the changes in propellant volume and chamber volume is minimized. This compares to curing as much lower pressure or even at atmospheric pressure for most prior solid propellant motors. Additionally, it is preferable that the pressurized motor be zone cured during the first stages of polymerization. In this manner, the cure progresses from the bottom or forward end of the motor up to the top or nozzle end to reduce any tendency for the propellant charge to crack internally due to shrinkage during its polymerization. Any shrinkage normally occurs during the first 24 hours of curing where a four to seven day cure is used. It is believed the invention will be further understood from the following detailed description and examples.

BRIEF DESCRIPTION OF THE DRAWING

The drawing is a cross-sectional view of a case bonded solid propellant rocket motor.

DESCRIPTION OF THE PREFERRED EMBODIMENT

There are several benefits to be achieved from a successful case bonded end burning solid propellant charge as disclosed herein. Significantly longer burning times and lower thrusts than those of conventional radial burning designs are possible for a given motor envelope and given components when relatively low acceleration applications are needed. As compared to the cartridge design, the case bonded end burning design additionally provides better retention or mounting of the solid propellant charge against handling forces on the ground, propellant charge deformations from creep during storage, and vibration and inertial set-back forces from acceleration during launch. Because of these factors, a higher reliability will result. Still another significant advantage of a case bonded end burning propellant is that a higher motor mass fraction can be achieved than for non-case bonded end burning designs, mainly because the insulative weight can be decreased. Also, the propellant weight can be increased; in the case bonded instance, the annulus which formerly existed between the inhibited propellant charge and insulated case is filled with propellant. Further, the inert motor weight is reduced since a trapping mechanism required for the non-case bonded charge is eliminated. Additionally, the combined weight of chamber insulation and propellant charge inhibitor for the non-case bonded motor can be reduced, since the insulator alone in the case bonded system performs both functions.

Although the concept of a case bonded end burning propellant motor had been previously considered, it was believed not to be feasible. Attempts to formulate or process satisfactory propellants were not successful because they led to cracking of the propellant charge due to temperature cycling or stresses induced in various stages of processing or handling. Thus, through the herein invention, as will be discussed, a type of propellant charge is utilized together with a processing technique that enables one to produce a successfully operable end burning case bonded solid propellant motor.

Turning now to the FIGURE, there is seen a solid propellant motor 11 comprised of an outer casing 13 of a suitable material such as titanium alloy or high-strength chrome steel. The chamber 13 is prepared for applying an insulating layer 15 by various means which specifically relate to cleaning the inner layer of the case in conventional manner. For example, the chamber can be bead blasted with glass beads, cleaned with acetone, rinsed with distilled water and then dried. After this, the chamber is then preferably primed with a commercial primer suitable for bonding the insulation layer 15 to the case 13. Several primers suitable for bonding rubbers to steel can be utilized. Obviously, one is chosen that is most compatible with the particular insulation 15 chosen.

The insulation layer 15 can be selected from various commercially available materials. Generally it comprises a rubbery binder incorporating asbestos fibers and/or silica fillers. One commercially available material is NBR Gen-Gard V-52 made by General Tire and Rubber Company, which utilizes a polybutadiene acrylonitrile rubber incorporating silica and asbestos fibers. Another suitable type of insulator, also made by General Tire and Rubber Company, is Gen-Gard 4010 which is an ethylene propylene terpolymer rubber having silica and asbestos fillers. Sheets of the insulation of suitable thickness are cut and laid up by hand against the primed motor case. As can be seen, the insulation 15 covers all the inside surface of the chamber 13. Preferably it will vary in thickness according to uniform taper from a thick section 17 at the nozzle end 19 to the thinnest section at the forward end 21 of the motor, in accord with exposure times to the hot gases. The nozzle end has a much longer exposure to the hot gases and thus is thicker, while the front of the case 21 has a much shorter exposure period and thus permits the thinner insulative layer.

In practice, the varying insulation thicknesses change incrementally. For example, different thicknesses of insulative sheets are used singly or consolidated into sections consisting of multilayer combinations. The insulation is bonded and cured to the motor casing by, for example, utilizing a vacuum bagging technique and subjecting the combined insulation-case assembly to appropriate cure temperatures for the required period of time under the necessary pressure conditions. The application of insulation in the aforegoing way, together with the insulation itself, is well known in the art and has for example been utilized in radial burning motors, and thus by itself does not form part of the herein invention.

Prior to loading the insulated chamber with propellant, the insulative surface is preferably treated to enhance the ultimate bond of the propellant charge to the insulation. This is an important operation. To accomplish this, the insulation layer is coated with a suitable solvent that will penetrate the insulation causing it to swell. For example, the insulation can be treated with a solution of toluene diisocyanate, TDI, and methylene chloride. The chamber is then heated to a temperature sufficient to remove the methylene chloride solvent and leave a controlled layer of toluene diisocyanate on or near the surface of the insulative layer. The TDI is particularly useful where the propellant contains a polyurethane binder because the absorbed isocyanate groups will react with active hydrogen groups such as alcohols present in the binder as it cures. Where the binder is of another type of polymer, then a bonding agent specific to that polymer is chosen.

Once again the concept of providing a suitable means for bonding the propellant to the insulative layer is well known and has been utilized for radial case bonding propellants of the polyurethane class under consideration.

One of the most important aspects of the herein invention is the selection of the propellant formulation to be used. Though specific examples of suitable propellant formulations that have been successfully used will be given, the following discussion will be particularly related to the properties that any propellant formulation must possess in order to achieve the results of this invention. As a result, the herein invention is not limited to particular propellant formulations developed, but rather any propellant formulation existing, or that is to be developed or can be developed, that meets the below requirements should be sufficient for the herein invention. The propellant selected should have a sufficient elongation and a low enough modulus that on cooling the rocket motor from its cure temperature to its use temperature, stresses within the propellant will not exceed its mechanical strength and such that the flight weight motor case would not buckle in view of the pronounced differences in thermal coefficient of expansion between the motor case and the propellant. Additionally, the propellant must have a sufficient elongation and low enough modulus that temperature variations during storage and handling and chamber expansion during firing will not cause the propellant charge to crack. The bonding of the propellant to the insulation and the insulation to the chamber should of course be strong enough that it will not rupture during the cool-down from cure and/or from temperature variations during handling or chamber expansion during firing.

The propellant elongation at maximum stress should preferably fall in the range of 85 to 400% while the propellant secant modulus should have values in the range of 175 to 5 psi. In the past, solid propellants have emphasized the need for higher modulus, such as 200 to 2000 psi while accepting much lower elongations, on the order of 5 to 50%. Thus, the major new requirements of the propellant for the herein invention are the significantly lower modulus and much higher elongation. These two mechanical properties of the propellant of this invention are believed to form a most important basis for the operability of the concept. Once a propellant meets the foregoing mechanical property requirements, one then can choose the formulation most desired based upon performance levels required or other system factors. As indicated, one of the main advantages of the utilization of an end burning case bonded propellant motor is to achieve a long burning time and have a low acceleration. Often such requirements also include high performance or good specific impulse.

These propellant compositions are based on binders generally known as polyurethanes because of their dependence upon the reaction between isocyanate and alcohol to form urethane linkages to build polymer size. Besides the binder, which will be described below, these propellants contain two other basic components. Ammonium perchlorate in solid particulate form serves as oxidizer; it is present in amounts ranging from 50 to 85 percent by weight. Other solid inorganic particulate salt oxidizers, such as hydroxyl ammonium perchlorate and ammonium nitrate, can be used in place of the ammonium perchlorate. A fuel such as aluminum or the like can be utilized if desired in amounts ranging from 0 to 25 percent by weight. When no metal fuel is employed, the binder serves that purpose alone. In addition to these materials, conventional additives can be present for reasons other than affecting mechanical properties. For example, an antioxidant such as phenyl-$\beta$-naphthylamine can be present in an amount ranging from 0.01 to 5 percent by weight. Further, burning rate modifiers, coolants, and other additives can be present in amounts up to 10 weight percent of the composition.

The binders used in the case-bonded end-burner rocket motor, which is the subject of this invention, are composed of five or six components, and each one of them has a specific purpose. Altogether, they polymerize to form a lightly cross-linked network polymer. Briefly listed, the components are: (1) Hydroxyl-terminated polypropylene oxide (PPG), manufactured by Union Carbide Corporation and designated PPG 2025, present in amounts ranging from 10 to 36 weight percent of the propellant; (2) Alrosperse, which is a reaction product of stearic acid and diethanol amine manufactured by Geigy Chemical Corporation, at concentrations of 0.1 to 5 percent; (3) Trimethylol propane (TMP), 0.01 to 5 percent; (4) 1-Decanol at 0 to 5 percent; (5) 2,6-Tolyl-diisocyanate (TDI), in concentrations ranging from 1 to 10 percent; and (6) Ferric acetyl acetonate (FeAA), at 0.01 to 1 percent by weight.

The last mentioned component, FeAA, is a urethane catalyst. The TDI is the only isocyanate-bearing compound in the formulation; it is difunctional: that is, each molecule of TDI contains two isocynate groups. The remaining four binder components, namely, the PPG, Alrosperse, TMP and decanol, are functional in active hydrogen groups (mostly alcohol), capable of reacting with isocyanate groups on the TDI to form urethane links. The PPG and the Alrosperse, like the TDI, are difunctional. Thus, balanced amounts (—OH = —NCO) of PPG and TDI would tend to produce high molecular-weight linear chain polymers. The addition of the tri-functional TMP (while near stoichiometric balance is retained) produces cross-linking between the chains, which is essential for long-term stability and to provide the return-to-shape aspect of the elastomeric binder. In general, highly cross-linked polymers are rigid and stiff; polymers with low cross-linking and high chain extension are soft and rubbery. The addition of the ingredient, Alrosperse, to the simple network polymeric binder just described adds a combination of strength and elongation through either or both of two mechanisms: increased intermolecular bonding relating to the amine and internal plastisization by the stearic side chain.

The chief binder formulation characteristic required to produce the high elongation and low modulus for the case-bonded end-burner motor configuration is a favoring of chain extension over cross linking. The obvious way to produce more chain extension at the expense of cross-linking is a direct reduction in the concentration of the trifunctional cross-linking agent, TMP. Previous experience with this binder system, however, showed that intolerable difficulties with quality control result from formulating with very low TMP. The new approach to the problem amounts to raising the cross-linking agent (TMP) level to improve quality control while at the same time adding a monofunctional alcohol (1-decanol) to reduce the cross-linking tendency. In simple proportions, each monofunctional alcohol molecule turns a triol molecule into a diol, simultaneously frustrating its cross-linking ability and retaining its chain-extension ability.

In the propellants so far applied successfully to the case bonded end burner, the above-listed and described ingredients were used. Almost any one or all of them may be replaced by a suitable substitute. Primarily, it is important to discuss this with regard to the binder ingredients, in contrast to oxidizer, fuel and others, because they hold chief influence over mechanical properties. In the first place, isocyanate and hydroxyl functional groups can not be replaced, since no other cure reaction suitable for solid propellant manufacture is known to have the characteristics necessary for the formulating technology employed here. The chief characteristic is a low instance of competing reactions. Substitute components will be mentioned as follows:

(1) For PPG: This type of binder ingredient is known as a prepolymer because it is supplied in a prepolymerized state. It is a chain molecule of about 2000 molecular weight with, theoretically, one hydroxyl at each end, or two per molecule. There are other hydroxyl-terminated prepolymers of interest. Two have hydrocarbon chains instead of the polyether of PPG; one is a saturated aliphatic, and the other is unsaturated, being a polybutadiene. They have been made in molecular weights ranging from 1000 to over 5000. At the present state of their technological development, none of these are suitable for this particular task because of their very large departure from the theoretical difunctionality needed for chain extension. When this deficiency is corrected they will be suitable for use herein.

(2) For Alrosperse: No substitute has been found for it in the PPG-based system. Though Alrosperse improves the mechanical properties of the propellant, a successful case-bonded motor can be made without using this material.

(3) For TMP: Any triol is a suitable candidate. Contemplated substitutes are hexane triol, trifunctional polypropylene oxide, glycerol, and pentaerythritol.

(4) For 1-Decanol: Other useful monohydric alcohols can include dodecanol, monofunctional polypropylene oxides and the like.

(5) For TDI: A great number of different diisocyanate compounds are commercially available. Of special interest are hexamethylene diisocyanate and dimer acid diisocyanate.

(6) For FeAA: The literature is well supplied with a great variety of urethane catalysts. They fall into two general classes: certain metal-organics and tertiary amines. All of these catalysts are potential substitutes for the FeAA.

The propellant after being suitably mixed is poured into the propellant case occupying area 23. Generally the propellant can be vacuum cast into the insulated case using conventional procedures. The case with the uncured propellant in it is then subjected to an unusually high regulated nitrogen pressure which should preferably compare to the operating pressure of the chamber during combustion. Typical pressures, for example, include 175 psi to 275 psi for chambers with proof test pressures of 290 to 300 psi. While under this pressure, which can be induced by regulated nitrogen flow from a pressure reservoir, and at the desired cure temperature, typically 140° F, the propellant is cured. The high pressure produces in the expanded case during curing an oversized solid propellant charge having compression loads.

During the early stages of polymerization or curing, which can for example take place during the first twenty-four hour period, the charge should be zone cured. This is achieved by allowing the cure to progress from the bottom or forward end 21 of the motor case toward the top or rear end 17 adjacent to the nozzle. This is done in order to reduce any tendency for the propellant charge to crack internally due to shrinkage during its polymerization. The cure is continued for an additional 3 to 6 days depending upon the size of the motor, at the cure temperature, which for the type of propellant formulation given above is in the range of 140° F, and with the motor at the established high pressure level.

Upon completing the cure, the motor is simultaneously cooled and depressurized slowly in order to reduce the temperature and stress gradients while reaching the storage or use temperature. For example, the motor can be cooled over a period of three days by readjusting the oven temperature and regulating the pressure to give decrements of ⅓ of the temperature and pressure each day. The length of the cooling period will be dependent upon the type and size of motor. For example, in larger motors the cooling and depressurization period could last over six days. The main point to be noted is that in order to better achieve the case bonded end burning propellant of this invention and avoid the separation of the propellant charge from the insulation and/or charge cracking, a cooling down period together with a depressurization over a relatively long period of time is preferred.

During the depressurization, the chamber volume will decrease while the propellant expands slightly. Concurrently the propellant will shrink during the cooling, together with the motor case, from the cure temperature to the final ambient temperature. Through the utilization of a proper pressure level during the cure period, the volume changes in the propellant during its return from the cure to ambient conditions, will essentially match the volume changes in the chamber during the propellant cure-down. Further, the use of high pressure during cure assures that the propellant is maintained in or near compression during the cool-down period when the relatively weak tensile strength of propellant and the propellant insulation bond indicate that tension stresses should preferably be avoided.

It is believed that the invention will be further understood from the following detailed examples:

EXAMPLE I

A case bonded end burning solid propellant motor was formed and tested. The motor had a motor case of 410 chrome steel which was 12 inches in diameter and 12.8 inches long. The case had 2:1 elliptical domes on each end and was heat treated to between 180,000–200,000 psi ultimate strength. It was designed for proof test pressure of 290 psi. The wall thickness in the cylindrical section of the motor casing was 0.013 inch. The chamber was prepared for insulating by bead blasting with 70 micron glass beads, cleaning with acetone, rinsing with distilled water and drying in a forced convection oven at 140° F for about three hours. Just before applying the insulation to the case, the inner surface of the case was primed with a commercially available primer for bonding polybutadiene acrylonitrile rubbers to steel. The primer was Thixon P-4 made by Dayton Chemical Products. After application the primer was allowed to dry. The insulation used was a commercially available material made by the General Tire & Rubber Company, designated as NBR Gen-Gard V-52, which is a polybutadiene acrylonitrile rubber having asbestos and silica fiber as a filler.

Sheets of the uncured insulation material were cut to appropriate shapes and laid up inside the case by hand to provide an insulation of the desired thickness. Thicknesses of the insulation varied from 0.4 inch in the nozzle dome to 0.3 inch in the cylindrical section of the motor to 0.2 inch in the forward dome for a burning time of 65 seconds. Where this same motor had a burning time designed for 45 seconds, the insulation accordingly varied from 0.26 inch in the nozzle dome to 0.23 inch in the rear half of the cylindrical section to 0.20 inch in the forward half of the cylindrical section, to finally 0.10 inch in the front dome portion. The insulation was then bonded and cured to the chamber by vacuum bagging with a plastic bag and fiberglass bleeder cloth, by subjecting the insulation alone to a vacuum of about 29 inches mercury in order to remove all gases from between layers of the insulation. The entire case and insulation was then subjected to a temperature of about 300° F for 105 minutes under a pressure of 100 psi in order to cure and consolidate the insulation into a continuous layer that adheres strongly to the case. Prior to loading the insulated chamber with propellant, the insulation was cleaned to remove bleeder cloth lint and any traces of grease or perspiration by scrubbing the insulation surface lightly with a stainless steel brush and acetone, then removing the acetone by evaporation in a forced convection oven for 16 hours at 160° F. Before the propellant was cast into the chamber, the insulation surface was treated to enhance the ultimate bond of the propellant charge to the insulation. This was accomplished by covering the insulation with a solution of toluene diisocyanate in methylene chloride. The solution contained 25 weight percent of toluene diisocyanate. The solution was allowed to remain on the insulation for 3 minutes to allow some solvent penetration and insulation swelling. The surplus solution was decanted and the insulated chamber heated in a forced air convection oven at 140° F overnight to remove the solvent and leave a controlled layer of toluene diisocyanate on and near the surface of the insulation.

The propellant utilized contained 64 weight percent of ammonium perchlorate in solid particulate form having a size distribution of 50 weight percent 400 microns, 34 weight percent 200 microns, and 16 weight percent 50 microns. Solid particulate aluminum powder in amount of 16 weight percent was used. The binder was hydroxyl terminated polypropylene oxide made by Union Carbide and designated PPG 2025, in an amount of 17.307 weight percent. 0.4677 weight percent of Alrosperse, which is a reaction product of stearic acid and diethanolamine, and is a difunctional hydroxyl material made by Geigy, 0.05544 weight percent of trimethylol propane and 1.8696 weight percent of 2,6-toluene diisocyanate were all added to the propellant mixture. A curing catalyst which was ferric acetyl acetonate was added in an amount 0.050 weight percent. Finally, the composition contained phenyl-$\beta$-naphthylamine in an amount of 0.25 weight percent as an antioxidant. The propellant, after mixing, was vacuum cast at 80° F into the insulated case. The insulated case containing the uncured propellant was then placed in a forced convection oven at 140° F and pressurized to 275 psi.

The propellant was then zone cured by allowing the curing to progress from the bottom or forward end of the motor toward the top or nozzle end. This was accomplished over a 24-hour period by circulating cold water in copper coils around the top of the chamber and insulating all parts except the bottom. The cure is triggered at the bottom so that the interface zone between the cured and uncured propellant would gradually progress up the charge. The cure was triggered physically at the bottom because it was uninsulated and was the region heated most quickly by the circulating hot air in the oven. At the end of the 24-hour zone curing period, the motor was then cured for an additional three days at the 140° F temperature while maintaining the motor under the foregoing pressure.

Upon completing the cure the motor was then cooled and depressurized slowly in order to reduce the temperature and stress gradients, while reaching the storage or use temperature. The cooling period was 3 days with decrements of ⅓ of the pressure and temperature being realized each day. An approximate analysis of the volume changes occurring during the cool-down of this stainless steel motor from cure revealed the changes indicated in Table I. The nozzle used for testing the motor was a conventional tape-wrapped carbon cloth and silica cloth impregnated with phenolic resin, utilizing a high density graphite insert in the throat region. A hot wire type igniter was utilized in order to minimize brisance. This was accomplished by positioning three 16 gram rectangular slabs of the propellant in the slotted section of the charge at the outer extremity of the propellant charge and at 120° to each other. Each propellant slab had a knife cut from one edge to about halfway to the center into which a 0.040 inch nichrome heating wire passed. On closing the firing circuit, the nichrome wire ignited the three slabs which then ignited the main propellant charge. The motor burned successfully. After about a 2 second ignition delay, typical of the gentle "hot wire igniter" used, the chamber pressure rose promptly to its igniter peak pressure of 158 psi, dropped quickly to its equilibrium pressure of 129 psi, then climbed gradually to a peak value of 197 psi after about 15 seconds. From then until the end of the firing at about 39 seconds, the pressure was slightly regressive until the brief pressure decay period. Pressures observed were a close approximation of those predicted from design data for the propellant used.

TABLE I

| | Volume Changes | |
|---|---|---|
| | 12 inch diameter chamber | 28 inch diameter chamber |
| Total chamber volume | 1151 cu.in. | 14,620 cu.in. |
| Depressurization from 275 psi | −12.6 cu.in. | — |
| from 175 psi | — | −140 cu.in. |
| Propellant expansion with | | |
| Depressurization from 275 psi | +0.63 cu.in. | — |
| from 175 psi | — | +5.1 cu.in. |
| Propellant thermal shrinkage | | |
| (cooling from 140° F to 60° F) | −13.8 cu.in. | −178 cu.in. |
| Case thermal shrinkage | | |
| (cooling from 140° F to 60° F) | −1.52 cu.in. | −17.2 cu.in. |
| Amount case volume change exceeded propellant volume change | +0.95 cu.in. (i.e., some net compression | −15.7 cu.in. (i.e., some net tension) |

EXAMPLE II

The procedure of Example I was repeated. However, a motor 28-inches in diameter by 28.8 inches long and having 2:1 elliptic domes was utilized. This motor was heat-treated to 160,000 – 175,000 psi ultimate strength, and designed for a proof test pressure of 302 psi. The wall thickness of the cylindrical section was 0.028 inch. In this motor, the insulator utilized, designated Gen-Gard 4010 and developed by General Tire & Rubber Company, was an ethylene propylene terpolymer rubber base with silica and asbestor fillers. Unlike the insulator utilized in Example I, this material had very little tack or stickiness so that a different primer and method of forcing adhesion during applying the chamber insulation was utilized. The motor case was coated with an undercoat designated Chemlock 234 and then coated with a primer designated Chemlok 205, both made by Hughson Chemical Company. The undercoat and primer were applied to the chamber and allowed to dry as an aid in promoting adhesion.

The tackiness of the insulator was enhanced by wiping its surface with n-heptane and drying for five minutes before lay-up in the chamber. Further adhesion was promoted by periodically vacuum bagging the partially insulated chambers for about ½ hour in order to maintain the insulation in intimate contact with the contoured domes of the chamber. This was continued until all the insulation was applied to the chamber and bonded thereto. The remaining steps of applying the insulation were the same as in Example I. The propellant utilized in this example was essentially the same as that in Example I. However, its elongation was improved significantly by incorporating a monohydric alcohol, namely 1-decanol, in the formulation in a relatively small amount. The propellant thus had the following composition by weight percent: Ammonium perchlorate, 64; aluminum, 16; hydroxyl terminated polypropylene oxide, 16.353; Alrosperse, 0.2946; trimethylol propane, 0.2319; 1-decanol, 0.4873; 2,6-toluene diisocyanate, 2.3465; ferric acetyl acetonate, 0.0369; and phenyl-$\beta$-naphthylamine, 0.2500. This particular propellant mixture had a secant modulus of 37 psi and an elongation of 178% as compared to the formulation of Example I, which had values of 102 and 98% respectively.

The curing conditions were the same as Example I, except that the curing after the first 24 hours of zone curing was for an additional 6 days for this larger motor. Upon completing the cure, the motor was allowed to cool over a period of six days, incrementally decreasing the pressure and temperature. This was done by maintaining the motor for two days at 125 psi and 110° F, three days at 75 psi and 80° F, and one day at 25 psi and 60° F. Because the particular static test firing facility used had adopted 60° F as its standard ambient temperature, the motors of examples I and II were cooled from the cure temperature to this reference "ambient" temperature. The results of the volume changes due to the curing and depressurization for this 28-inch diameter titanium alloy motor can be seen in Table I above.

This large motor used five igniters, four positioned in the charge slot out from the propellant charge center and at 90° to each other, and the fifth in the center. The igniters were ¾-inch diameter by 4 inches long aluminum tubes, with a 0.010 inch wall. They were perforated with ⅛ inch diameter holes distributed over the central 3-inch portion. Inside the center of each tube were 17 grams of AlClO igniter pellets. On both sides of the igniter pellets were boron-potassium nitrate pellets and adjacent to the boron pellets were S-90 electric squibs positioned to impact the pellets when fired. The igniters with the total weight of 125 grams produced a pressure in the motor that reached 95% of its equilibrium chamber pressure in approximately 90 milliseconds. This motor fired successfully. The results can be seen in Table II below, as compared to the successful firing results of the motor in Example I. The pressure-time program was in good agreement with the predicted program.

TABLE II

| Parameters | Individual Values | |
|---|---|---|
| | 12" Motor | 28" Motor |
| Propellant weight, lb. | 60.5 | 783 |
| Grain temp., ° F | 60 | 60 |
| Igniter peak pressure, psia | 158 | 153 |
| Initial chamber pressure, psia | 129 | 105 |
| Maximum pressure, psia | 197 | 136 |
| Mean effective pressure, psia | 178 | 110 |
| Action time, seconds | 39.4 | 110 |
| Average mass flow rate, lbs/sec | 1.44 | 7.1 |
| Change in throat area % | 1.5 | 0.3 |
| Estimated inert weight exhausted, lbs. | .72 | 12.5 |

TABLE II-continued

| Parameters | Individual Values | |
|---|---|---|
| | 12" Motor | 28" Motor |
| lbs. | | |

What is claimed is:

1. A long-burning, case bonded, end burning solid propellant motor having a maximum acceleration of less than 1 g comprising:
    an outer motor case,
    an end burning solid propellant charge bonded to said case, said propellant having an elongation at maximum stress of 85 to 400 percent and a secant modulus of from 175 to 5 psi, and comprising a minor amount of an elastomeric binder including a prepolymer having a molecular weight from 1000 to 5000 containing reactive terminal functional groups, a difunctional compound reactive with said groups, at least one trifunctional compound and a monofunctional compound to form a lightly cross-linked elastomeric network and a major amount of a solid particulate oxidizer salt,
    an insulative liner comprising a rubber binder containing heat insulation fillers bonded to the inner walls of said motor case and to said propellant charge.

2. The motor of claim 1 wherein said propellant has a polyurethane resin binder system.

3. The motor of claim 2 wherein the binder system of said propellant comprises:
    a difunctional hydroxyl terminated prepolymer,
    a triol in an amount sufficient to cross-link said polymer to obtain the desired elongation and modulus,
    a diisocyanate containing compound in an amount sufficient to chain extend the polymer to obtain the desired elongation and modulus, and
    a monofunctional alcohol in an amount sufficient to obtain the desired elongation and modulus.

4. The motor of claim 3 wherein the propellant formulation comprises:
    from 50 to 85 weight percent solid particulate oxidizer salts selected from nitrates and perchlorates,
    from 0 to 25 weight percent of a metal fuel,
    from 10 to 36 weight percent of a hydroxyl terminated prepolymer,
    from 0.01 to 5 weight percent of a triol,
    from 0 to 5 weight percent of a monohydric alcohol,
    from 1 to 10 weight percent of a diisocyanate compound,
    and from 0.01 to 1 weight percent of a urethane curing catalyst.

5. The motor of claim 4 wherein said prepolymer is hydroxyl terminated polypropylene oxide, said triol is trimethylol propane, and said monohydric alcohol is 1-decanol.

6. The motor of claim 1 in which said fillers are selected from silica, asbestos and mixtures thereof.

7. The motor of claim 1 in which the oxidizer salt is an inorganic oxidizer salt.

8. The motor of claim 7 in which the salt is ammonium perchlorate.

* * * * *